(12) United States Patent
Choi

(10) Patent No.: US 9,103,257 B2
(45) Date of Patent: Aug. 11, 2015

(54) METHOD OF DETERMINING DOC REGENERATION CYCLE

(71) Applicant: Hyundai Motor Company, Seoul (KR)

(72) Inventor: Sung Mu Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 221 days.

(21) Appl. No.: 13/687,448

(22) Filed: Nov. 28, 2012

(65) Prior Publication Data

US 2014/0053534 A1    Feb. 27, 2014

(30) Foreign Application Priority Data

Aug. 22, 2012    (KR) .......... 10-2012-0091596

(51) Int. Cl.
| | | |
|---|---|---|
| *F01N 3/20* | (2006.01) | |
| *F01N 3/10* | (2006.01) | |
| *F02D 41/02* | (2006.01) | |
| *F01N 11/00* | (2006.01) | |
| *F01N 3/035* | (2006.01) | |
| *F02D 41/14* | (2006.01) | |

(52) U.S. Cl.
CPC .................. *F01N 3/20* (2013.01); *F01N 3/035* (2013.01); *F01N 3/103* (2013.01); *F01N 11/002* (2013.01); *F02D 41/025* (2013.01); *F02D 41/027* (2013.01); *F01N 2550/02* (2013.01); *F01N 2900/0422* (2013.01); *F01N 2900/102* (2013.01); *F01N 2900/1602* (2013.01); *F01N 2900/1606* (2013.01); *F01N 2900/1631* (2013.01); *F02D 41/029* (2013.01); *F02D 41/1446* (2013.01); *F02D 41/1454* (2013.01); *F02D 2200/0625* (2013.01); *F02D 2200/0802* (2013.01); *Y02T 10/26* (2013.01); *Y02T 10/47* (2013.01)

(58) Field of Classification Search
CPC .............. F01N 3/103; F01N 2900/102; F01N 2900/0422; F01N 2900/1602; F01N 2900/1631; F01N 2550/02; F02D 41/027; F02D 2200/0802; F02D 4/025
USPC .......................................... 60/285, 286, 295
See application file for complete search history.

(56) References Cited

FOREIGN PATENT DOCUMENTS

| JP | 09-096215 (A) | 4/1997 |
|---|---|---|
| JP | 11-280456 (A) | 10/1999 |
| KR | 10-0795033 B1 | 1/2008 |
| KR | 10-0795033 (B1) | 1/2008 |
| KR | 10-2010-0064918 (A) | 6/2010 |
| KR | 10-2011-0024252 (A) | 3/2011 |
| WO | WO 01/19500 (A1) | 3/2001 |

OTHER PUBLICATIONS

Machine translation of KR100795033B1, accessed Dec. 9, 2014.*

* cited by examiner

*Primary Examiner* — Kenneth Bomberg
*Assistant Examiner* — Jonathan Matthias
(74) *Attorney, Agent, or Firm* — Morgan, Lewis & Bockius LLP

(57) ABSTRACT

Disclosed herein is a method of determining a DOC regeneration cycle of a vehicle, in which the DOC regeneration cycle is determined such that a rich fuel-air mixture is repeatedly and periodically applied to the DOC, and the regeneration of the DOC is accelerated, thereby improving the purification performance of the DOC.

19 Claims, 4 Drawing Sheets

METHOD OF DETERMINING DOC REGENERATION CYCLE

CROSS-REFERENCE TO RELATED APPLICATION

The present application claims priority of Korean Patent Application Number 10-2012-0091596 filed Aug. 22, 2012, the entire contents of which application is incorporated herein for all purposes by this reference.

BACKGROUND OF INVENTION

1. Field of Invention

The present invention relates to a method of determining a diesel oxidation catalyst (DOC) regeneration cycle of a vehicle, which can activate DOC and can improve the purification performance of DOC.

2. Description of Related Art

When a diesel engine is running, exhaust gas is discharged from the diesel engine. Exhaust gas includes HC, CO, soluble organic fraction (SOF), soot, particulate matter (PM), and the like. When the materials included in exhaust gas are directly discharged into the air, serious environmental problems, such as air pollution and the like, occur. Therefore, these materials must be suitably purified before being discharged. For this purpose, a diesel particulate filter (DPF) and a diesel oxidation catalyst (DOC) of a vehicle are used. A DPF collects PM in the air, and then periodically burns and remove PM after a predetermined amount of PM has been collected. A DOC is a dual catalyst that converts CO and HC into $CO_2$ and $H_2O$ by oxidation, and removes SOF from exhaust gas, and then discharges the purified exhaust gas into the air.

Meanwhile, the EURO-6 "automobile exhaust gas regulation" will be applied from 2014. The average exhaust gas temperature must be controlled to 140° C. or less according to EURO-6, and thus the exhaust gas discharged from a diesel engine must conform with EURO-6. Further, the exhaust gas temperature based on EURO-6 becomes lower than the exhaust gas temperature based on EURO-5, and thus the activity of a catalyst must be improved such that the catalyst efficiently operates even at low temperature. In this case, in order to improve the activity of a catalyst at low temperature, the amount of a precious metal in the catalyst must be increased. However, when the amount of a precious metal in the catalyst increases, the catalyst becomes expensive, and the activity of the catalyst at low temperature does not greatly increase even when the amount of a precious metal is increased, so that it is required that the activity of the catalyst be improved using other methods.

A diesel engine generally operates in a lean fuel-air mixture state. However, when a rich fuel-air mixture is periodically supplied, the DOC activity increases. When the cycle of supplying a rich fuel-air mixture is excessively short, the fuel efficiency of the diesel engine becomes low. Further, when the cycle thereof is excessively long, the diesel engine is advantageous in terms of fuel efficiency, but contaminants are not effectively removed compared to when a conventional catalyst is used, because the rich fuel-air mixture returns to the state of a rich fuel-air mixture not being supplied. Therefore, in order to effectively improve the DOC activity, a rich fuel-air mixture must be resupplied when the effect of improvement of the DOC activity attributable to the previously-supplied fuel-air mixture remains to some degree.

It is to be understood that the foregoing description is provided to merely aid the understanding of the present invention, and does not mean that the present invention falls under the purview of the related art which was already known to those skilled in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of determining a diesel oxidation catalyst (DOC) regeneration cycle, wherein a DOC can be activated without increasing the amount of a precious metal to efficiently remove contaminants adsorbed on the DOC, thereby cleaning the surface of the DOC, and wherein the oxidized precious metal is reduced to allow exhaust gas to be easily adsorbed and desorbed on the DOC, thereby improving the ability of the DOC to oxidize CO and HC to ultimately purify exhaust gas.

Various aspects of the present invention provide for a method of determining a DOC regeneration cycle of a vehicle, including the steps of: applying a rich fuel-air mixture to a DOC to control a concentration of an fuel-air mixture (S130); measuring a temperature of a front end of the DOC when the concentration of the fuel-air mixture becomes lean (S150); calculating a thermal load value based on the temperature measured in the step (S150) after the concentration of the air-fuel becomes lean, accumulating the calculated thermal load value with respect to each predetermined time, and then comparing the accumulated thermal load value with a predetermined critical value to determine whether the accumulated thermal load value exceeds the predetermined critical value (S170); and repeatedly performing the step (S150) when the accumulated thermal load value is equal to or less than the critical value, and determining a cycle of repeatedly performing the step (S130) based on the time it takes to perform all of the steps when the accumulated thermal load value exceeds the critical value.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to improve the activity of a diesel oxidation catalyst (DOC) at low temperature, there is a method of increasing the amount of a precious metal in DOC. However, when the amount of a precious metal increases, cost increases, and the activity of the DOC does not greatly increase in proportion to the increase of the precious metal. Therefore, other methods for improving the activity of the DOC are needed.

A diesel engine generally operates in a lean fuel-air mixture state. Therefore, when a rich fuel-air mixture is applied to the diesel engine, HC, SOF, soot and sulfur oxides adsorbed on a catalyst are effectively removed, and thus the surface of the catalyst is cleaned, thereby increasing the activity of a DOC. However, with the passage of time, the fuel-air mixture become lean again, so that the influence of the rich fuel-air mixture on the DOC disappears, with the result that the activity of the DOC gradually decreases, thereby returning the state of rich fuel-air mixture to the original state which is a lean fuel-air mixture state. Consequently, when a rich fuel-air mixture is repeatedly applied in a state of the activity of the DOC not being deteriorated, the activity of the DOC is maintained.

However, when a rich fuel-air mixture is applied too frequently, the DOC becomes inefficient because a rich fuel-air mixture is unnecessarily applied in a state in which the effect of improvement of the activity of the DOC still exists, and the fuel efficiency of a diesel engine becomes low because fuel consumption increases. Conversely, when a rich fuel-air mixture is applied too infrequently, a diesel engine gains an advantage in terms of fuel efficiency because fuel consumption decreases, but the ability of the DOC to purify contaminants is not improved compared to a conventional DOC because the state of a rich fuel-air mixture returns to the original state in which the rich fuel-air mixture is not applied yet.

Therefore, in order to obtain the optimum effect of improvement of the activity of the DOC, a rich fuel-air mixture must be further applied when a residual effect of improvement of the activity of the DOC still exists to some degree. For this reason, it is very important to appropriately determine the cycle of repeatedly applying a rich fuel-air mixture to the DOC.

Figure 1:
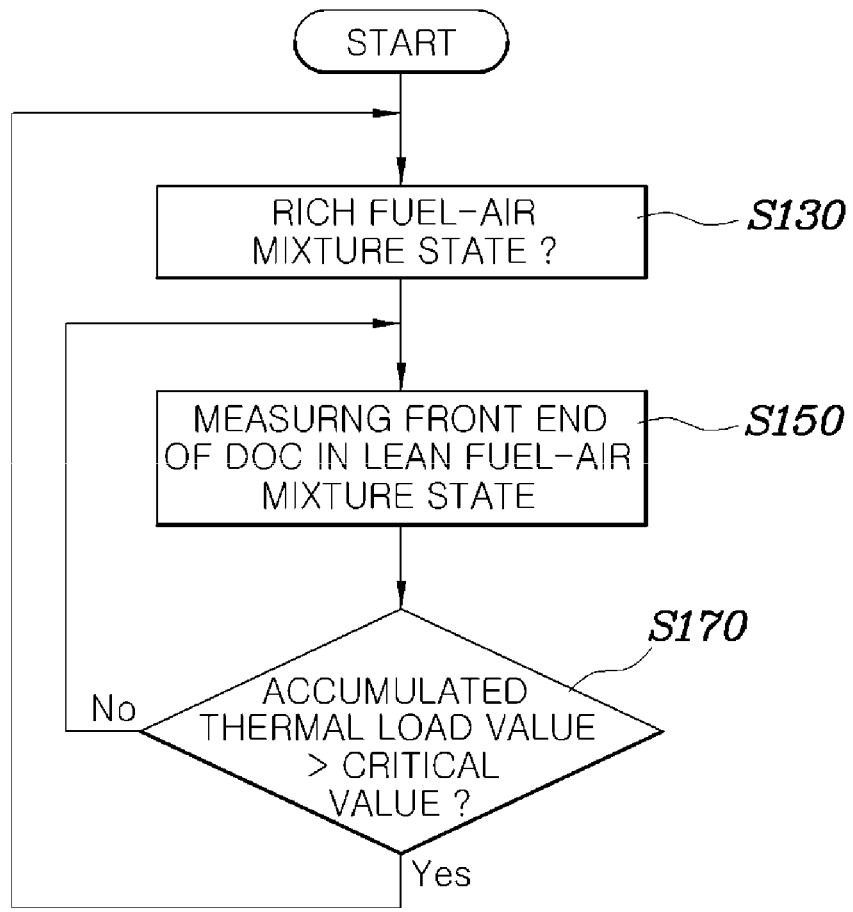
FIG. 1 is a flowchart showing an exemplary method of determining a diesel oxidation catalyst (DOC) regeneration cycle according to the present invention.

FIG. 1 shows a series of processes of determining a cycle of repeatedly applying a rich fuel-air mixture to a DOC according to various embodiments of the present invention.

In the step of applying a rich fuel-air mixture (S130), the temperature of the front end of the DOC is maintained between 250° C. and 750° C., the temperature of the bed of the DOC is maintained 800° C. or less, and an air excess ratio is maintained between 0.8 and 1.0 for 10 seconds or less. This step may be performed once or several times according to the following conditions.

In the application of a rich fuel-air mixture, the effect of improvement of the activity of the DOC increases as the exhaust gas temperature is high, the air excess ratio is low and the time for maintaining a rich fuel-air mixture state is long. However, when the exhaust gas temperature, air excess ratio and time for maintaining a rich fuel-air mixture state reach and exceed predetermined values, the effect of improvement of the activity of the DOC becomes saturated, and thus the effect of improvement of the activity of the DOC is not improved any more. Therefore, the degree of a rich fuel-air mixture state is controlled by appropriately adjusting an air excess ratio using an oxygen sensor and temperature sensors located at the front and rear of the DOC.

If the time for maintaining a rich fuel-air mixture state increases, when a rich fuel-air mixture state is converted into a lean fuel-air mixture state, residual fuel, which did not react with air in the rich fuel-air mixture state, reacts with residual air, which did not react with fuel in the lean fuel-air mixture, in the DOC, so that the temperature in the DOC rapidly increases, thereby causing the DOC to be thermally damaged. Therefore, time for maintaining a rich fuel-air mixture state must be appropriately adjusted.

As described above, in the step of applying the rich fuel-air mixture (S130), when the rich fuel-air mixture state is converted into a lean fuel-air mixture state, the influence of the rich fuel-air mixture on the DOC disappears with the passage of time, and thus the activity of the DOC gradually decreases. In the present invention, in the lean fuel-air mixture state, the exhaust gas temperature is maintained below 750° C., and an air excess ratio is maintained above 1. The temperature of the front end of the DOC is measured while the lean fuel-air mixture is maintained after the rich fuel-air mixture state is converted into the lean fuel-air mixture state. This step is the step of measuring the temperature (S150).

The thermal load value is calculated by the Formula t*exp (−R/T) based on the temperature measured in the step (S150). In the Formula above, since R is a characteristic value of a catalyst and is a specific value thereof, R is changed depending on the kind of a catalyst. T is the temperature of the front end of the DOC measured in the step (S150), and is the absolute temperature. t is the time interval required to accumulate the thermal load values.

The calculated thermal load value serves as an important index. Since the effect of improvement of the DOC activity disappears when the DOC is under a predetermined thermal load or more, in order to allow the measured thermal load value not to exceed the predetermined value, the temperature of the front end of the DOC is measured, the thermal load value is calculated based on the measured temperature, the measured thermal load values are accumulated with respect to each predetermined time, and then the accumulated thermal load value is compared with a predetermined critical value. This step is the step of determining whether the accumulated thermal load value is greater than the predetermined critical value (S170).

The critical value is a value determining the time point at which the step of applying the rich fuel-air mixture (S130) is carried out again such that the rich fuel-air mixture applied in the step (S130) is maintained in a state in which DOC is not deteriorated. The critical value may be changed when conditions, such as the catalyst and the like, are changed.

As the result of comparing the accumulated thermal load value with the critical value in the step (S170), when the accumulated thermal load value is equal to or less than the critical value, the step (S150) is repeatedly carried out to continuously accumulate the thermal load values. Conversely, when the accumulated thermal load value exceeds the critical value, a cycle of applying a rich fuel-air mixture to DOC is completed, and simultaneously a DOC regeneration cycle of repeatedly performing the step (S130) based on the time it takes to perform all of the steps is determined.

In this way, when the rich fuel-air mixture is periodically applied to the DOC, HC, SOF, SOOT, sulfur oxide and the like adsorbed on the DOC are effectively removed to clean the surface of the DOC, and the oxidized precious metal is reduced to convert the oxidized precious metal into the original precious metal to allow exhaust gas to be easily adsorbed in a catalyst and desorbed from the catalyst and to improve the ability of DOC to purify CO/HC, thereby activating the DOC. Further, nitrates are removed from the catalyst existing in the form of cerium nitrate by the activation of DOC to accelerate a migration reaction ($CO+H_2O \rightarrow H_2+CO_2$), thus effectively reducing CO.

Figure 2:
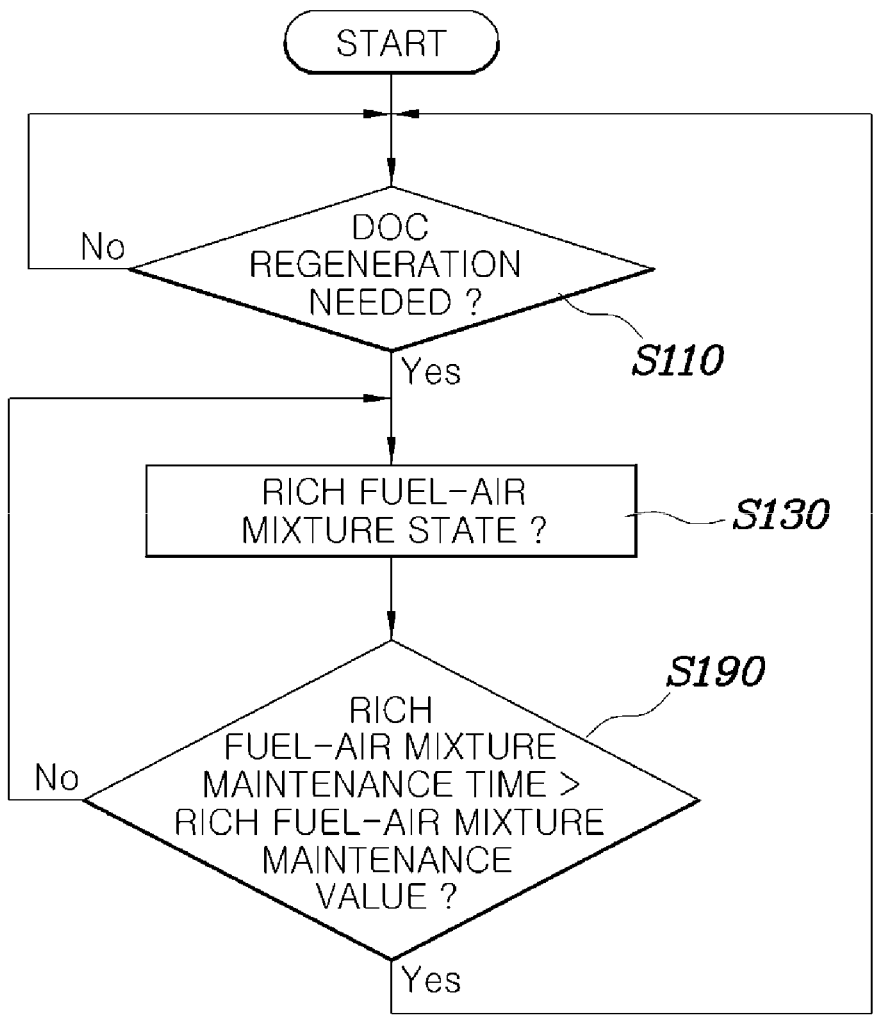
FIG. 2 is a flowchart showing an exemplary method of determining a DOC regeneration cycle according to the present invention.

FIG. 2 is a flowchart showing a method of determining a DOC regeneration cycle according to a various embodiments of the present invention. FIG. 2 shows a series of processes of regenerating a DOC by determining whether the DOC needs to be regenerated.

In the step of determining whether the DOC needs to be regenerated (S110), when it is determined that the DOC needs to be regenerated, the step (S130) of applying the rich fuel-air mixture is performed.

In the step (S130) of applying the rich fuel-air mixture, the temperature of the front end of the DOC is maintained between 250° C. and 750° C., the temperature of the DOC is maintained 800° C. or less, and the air excess ratio is maintained between 0.8 and 1.0. In order to avoid saturating the effect of improvement of DOC activity, the degree of the rich fuel-air mixture state is controlled by appropriately adjusting the air excess ratio using an oxygen sensor and temperature sensors located at the front and rear of the DOC.

In the step (S130) of applying the rich fuel-air mixture, when a rich fuel-air mixture state is formed by applying the rich fuel-air mixture to the DOC, the time for maintaining the rich fuel-air mixture state is compared with a predetermined rich fuel-air mixture state maintenance value. This step is the step of determining whether the rich fuel-air mixture state is to be maintained (S190). The rich fuel-air mixture state maintenance value is a value determining the time point at which the step of applying the rich fuel-air mixture (S130) is carried out again such that the rich fuel-air mixture applied in the step (S130) is maintained in a state in which the DOC does not deteriorate.

In the step (S190) of determining whether the rich fuel-air mixture state is to be maintained, when the time for maintaining the rich fuel-air mixture state is equal to or less than the rich fuel-air mixture state maintenance value, the fuel-air mixture state is maintained rich by repeatedly performing the step (S130) of applying the rich fuel-air mixture. Conversely, when the time for maintaining the rich fuel-air mixture state exceeds the rich fuel-air mixture state maintenance value, DOC regeneration has completed, and simultaneously the step (S110) of determining whether DOC needs to be regenerated is repeatedly performed.

Figure 3:
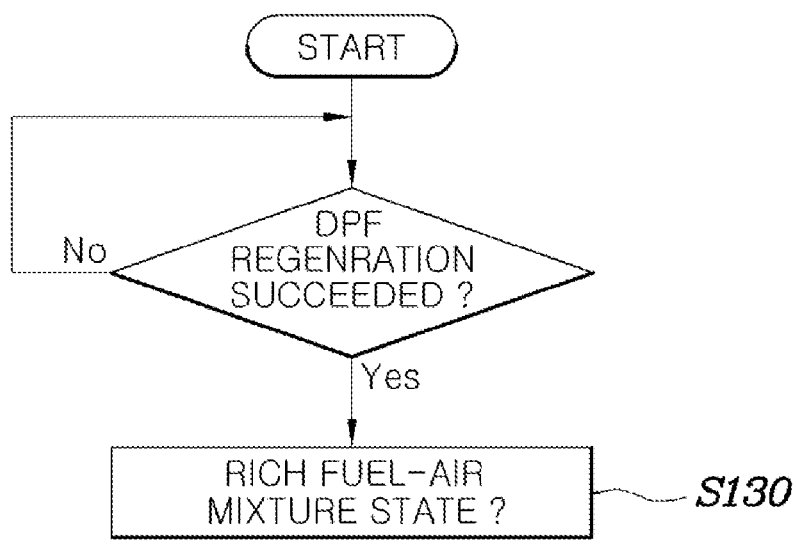
FIG. 3 is a first example of the method according to the method of FIG. 2.

FIG. 3 shows the step (S110) of determining whether DOC needs to be regenerated, shown in FIG. 2, in detail. When it is determined that the regeneration of a diesel particulate filter (DPF) succeeded in the step (S110), the above series of steps are performed. The regeneration of the DPF may be performed one or more times as long as DOC does not deteriorate. After the regeneration of DPF is successfully performed, the above series of steps are performed.

Figure 4:
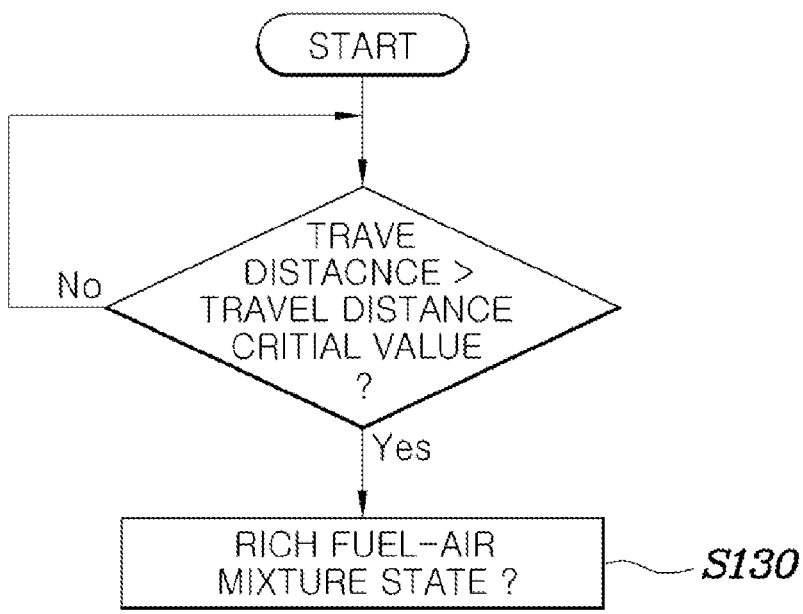
FIG. 4 is a second example of the method according to the method of FIG. 2.

FIG. 4 shows the step of determining whether a DOC needs to be regenerated using the accumulated travel distance of a vehicle. When it is determined that the accumulated travel distance exceeds a predetermined critical travel distance by comparing the accumulated travel distance with the critical travel distance, the above series of steps are performed. The critical travel distance is set such that the DOC does not deteriorate in the step (S110) of determining whether the DOC needs to be regenerated. Further, the activation of the DOC can be optimized by performing the step of comparing the accumulated travel distance with the critical travel distance when the amount of soot collected in the DPF of a vehicle is equal to or less than a predetermined amount.

Figure 5:
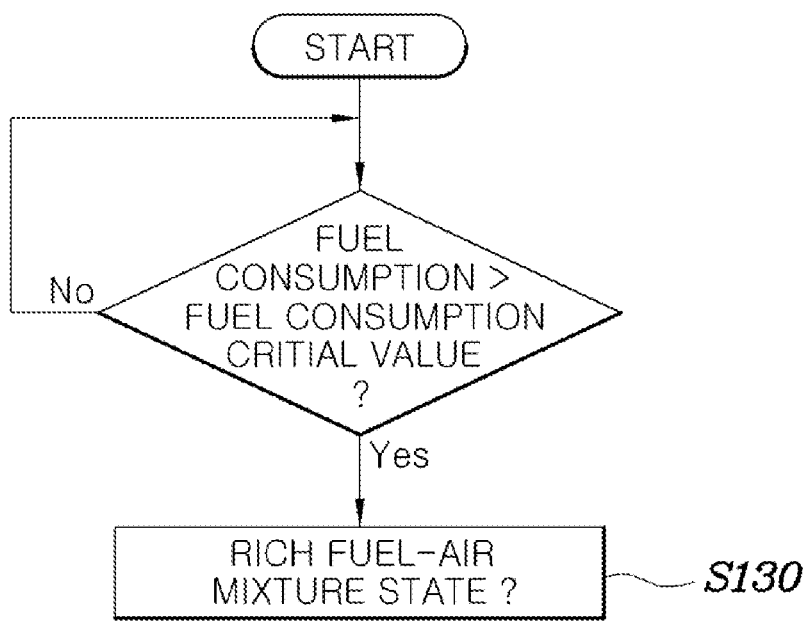
FIG. 5 is a third example of the method according to the method of FIG. 2.

FIG. 5 shows the step of determining whether a DOC needs to be regenerated using the accumulated fuel consumption of a vehicle. In the step (S110) of determining whether the DOC needs to be regenerated, the accumulated fuel consumption of a vehicle is compared to a predetermined fuel consumption critical value. When it is determined that the accumulated fuel consumption exceeds the predetermined fuel consumption critical value, the above series of steps are performed. The fuel consumption critical value is previously set such that the DOC does not deteriorate. Further, the activation of the DOC can be optimized by performing the step of comparing the accumulated fuel consumption thereof with the fuel consumption critical value when the amount of soot collected in the DPF of a vehicle is equal to or less than a predetermined amount.

As described above, when the rich fuel-air mixture is repeatedly applied for a predetermined amount of time to DOC, DOC can effectively purify CO/HC even at low temperature, thus efficiently coping with the exhaust gas regulation EURO-6. Further, when the rich fuel-air mixture is applied to DOC at a temperature lower than desulfurization for a short period of time, DOC can be effectively activated, so that the efficiency of DOC at low temperature increases, thereby reducing the cost of DOC.

As described above, the present invention provides a method of determining a DOC regeneration cycle by supplying a rich fuel-air mixture. According to the method of the present invention, the precious metal of a catalyst is reduced, so that exhaust gas is easily adsorbed and desorbed on the DOC, thereby improving the ability of DOC to oxidize CO and HC to ultimately purify the exhaust gas. Further, according to the method of the present invention, a rich fuel-air mixture is supplied in an appropriate cycle, so that the decrease in fuel efficiency is minimized, thereby minimizing the material cost of DOC.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining and performing a diesel oxidation catalyst (DOC) regeneration cycle of a vehicle, the method comprising:
   applying a rich fuel-air mixture to a DOC to control a concentration of a fuel-air mixture;
   measuring a temperature of a front end of the DOC when the concentration of the fuel-air mixture becomes lean;

calculating a thermal load value based on the temperature measured in the measuring step with respect to the time elapsed from when the fuel-air mixture becomes lean;

accumulating the calculated thermal load values from every iteration of the measuring and calculating steps performed from when the air-fuel mixture becomes lean;

comparing the accumulated thermal load value with a predetermined critical value to determine whether the accumulated thermal load value exceeds the predetermined critical value;

repeatedly performing the measuring, calculating and accumulating steps step when the accumulated thermal load value is equal to or less than the predetermined critical value; and repeatedly performing all of the steps beginning with the applying step when the accumulated thermal load value exceeds the predetermined critical value.

2. The method of claim 1, wherein, in the applying step, a temperature of a front end of the DOC is maintained between 250° C. and 750° C.

3. The method of claim 1, wherein, in the applying step, a temperature of a bed of the DOC is maintained below 800° C.

4. The method of claim 1, wherein, in the applying step, an air excess ratio is maintained between 0.8 to 1.0.

5. The method of claim 1, wherein, in the calculating step, the thermal load value is calculated by the formula t*exp(−R/T), in which R is a characteristic value of a catalyst, T is an absolute temperature of the front end of DOC measured in the measuring step, and t is a time interval required to accumulate the thermal load values.

6. The method of claim 1, wherein, in the calculating step, the critical value is a value determining the time point at which the step of applying the rich fuel-air mixture is carried out again such that the rich fuel-air mixture applied in the applying step is maintained in a state in which the DOC is not deteriorated.

7. A method of determining and performing a DOC regeneration cycle of a vehicle comprising the steps of:

determining whether a DOC needs to be regenerated;

applying a rich fuel-air mixture to the DOC to control a concentration of a fuel-air mixture when it is determined that the DOC needs to be regenerated;

comparing the time for maintaining a rich fuel-air mixture state with a predetermined rich fuel-air mixture state maintenance value when the rich fuel-air mixture state is formed by applying the rich fuel-air mixture to the DOC in the applying step to determine whether the time for maintaining the rich fuel-air mixture state exceeds the rich fuel-air mixture state maintenance value;

repeatedly performing the step of applying the rich fuel-air mixture and the step of comparing when the time for maintaining the rich fuel-air mixture state is equal to or less than the rich fuel-air mixture state maintenance value; and repeatedly performing all the steps beginning with the determining whether the DOC needs to be regenerated step when the time for maintaining the rich fuel-air mixture state exceeds the rich fuel-air mixture state maintenance value.

8. The method of claim 7, wherein, in the determining step, when it is determined that a regeneration of a diesel particulate filter (DPF) has completed, above series of steps are performed.

9. The method of claim 8, wherein the above series of steps are performed whenever the regeneration of the DPF is performed several times.

10. The method of claim 8, wherein, in the determining step, when a travel distance of a vehicle is compared with a predetermined critical travel distance to determine that the travel distance exceeds the critical travel distance, the above series of steps are performed.

11. The method of claim 10, wherein the travel distance is compared with the critical travel distance when an amount of soot collected in the DPF of a vehicle is equal to or less than a predetermined amount.

12. The method of claim 8, wherein, in the determining step, when fuel consumption during vehicle operation is compared with a predetermined fuel consumption critical value to determine that the fuel consumption exceeds the fuel consumption critical value, the above series of steps are performed.

13. The method of claim 12, wherein the critical travel distance is a value determining the time point at which the step of applying the rich fuel-air mixture is carried out again such that the DOC does not deteriorate in the step of determining whether the DOC needs to be regenerated.

14. The method of claim 12, wherein the fuel consumption is compared with the fuel consumption critical value when an amount of soot collected in the DPF of a vehicle is equal to or less than a predetermined amount.

15. The method of claim 8, wherein, in the applying step, a temperature of a front end of the DOC is maintained between 250° C. and 750° C.

16. The method of claim 15, wherein the fuel consumption critical value is a value determining the time point at which the step of applying the rich fuel-air mixture is carried out again such that the DOC does not deteriorate in the step of determining whether the DOC needs to be regenerated.

17. The method of claim 8, wherein, in the applying step, a temperature of a bed of the DOC is maintained below 800° C.

18. The method of claim 8, wherein, in the applying step, an air excess ratio is maintained between 0.8 to 1.0.

19. The method of claim 8, wherein the rich fuel-air mixture state maintenance value is a value determining the time point at which the step of applying the rich fuel-air mixture is carried out again such that the rich fuel-air mixture applied in the applying step is maintained in a state in which the DOC is not deteriorated.

* * * * *